United States Patent

[11] 3,582,211

[72] Inventors Douglas G. McClure;
John W. Thomas, both of Escondido, Calif.
[21] Appl. No. 863,263
[22] Filed Oct. 2, 1969
[45] Patented June 1, 1971
[73] Assignee DoAll Company
Des Plaines, Ill.

[54] GONIOMETER
9 Claims, 2 Drawing Figs.
[52] U.S. Cl. ................................ 356/110,
33/125, 356/138, 356/152
[51] Int. Cl. ................................ G01b 9/02,
G01b 11/26, G01b 9/10
[50] Field of Search .......................... 356/110,
152, 138, 106; 33/125

[56] References Cited
UNITED STATES PATENTS
3,085,466 4/1963 Hemstreet .................. 356/110

FOREIGN PATENTS
1,380,740 1964 France .................. 356/110

Primary Examiner—Ronald L. Wibert
Assistant Examiner—J. Rothenberg
Attorney—Ira Milton Jones ABSTRACT: A flat granite base has a turntable mounted thereon for rotation about a fixed axis; and an endless tape trained about the turntable and a drive wheel by which rotation can be imparted to the turntable, has one stretch thereof attached to a slide which rides in a straight track on the base. An interferometer on the base and a light-reflecting mirror on the slide coact to measure movement of the slide along the track and thereby provide a precisely correct measurement of the angle through which the turntable and a part fixed thereon has been rotated.

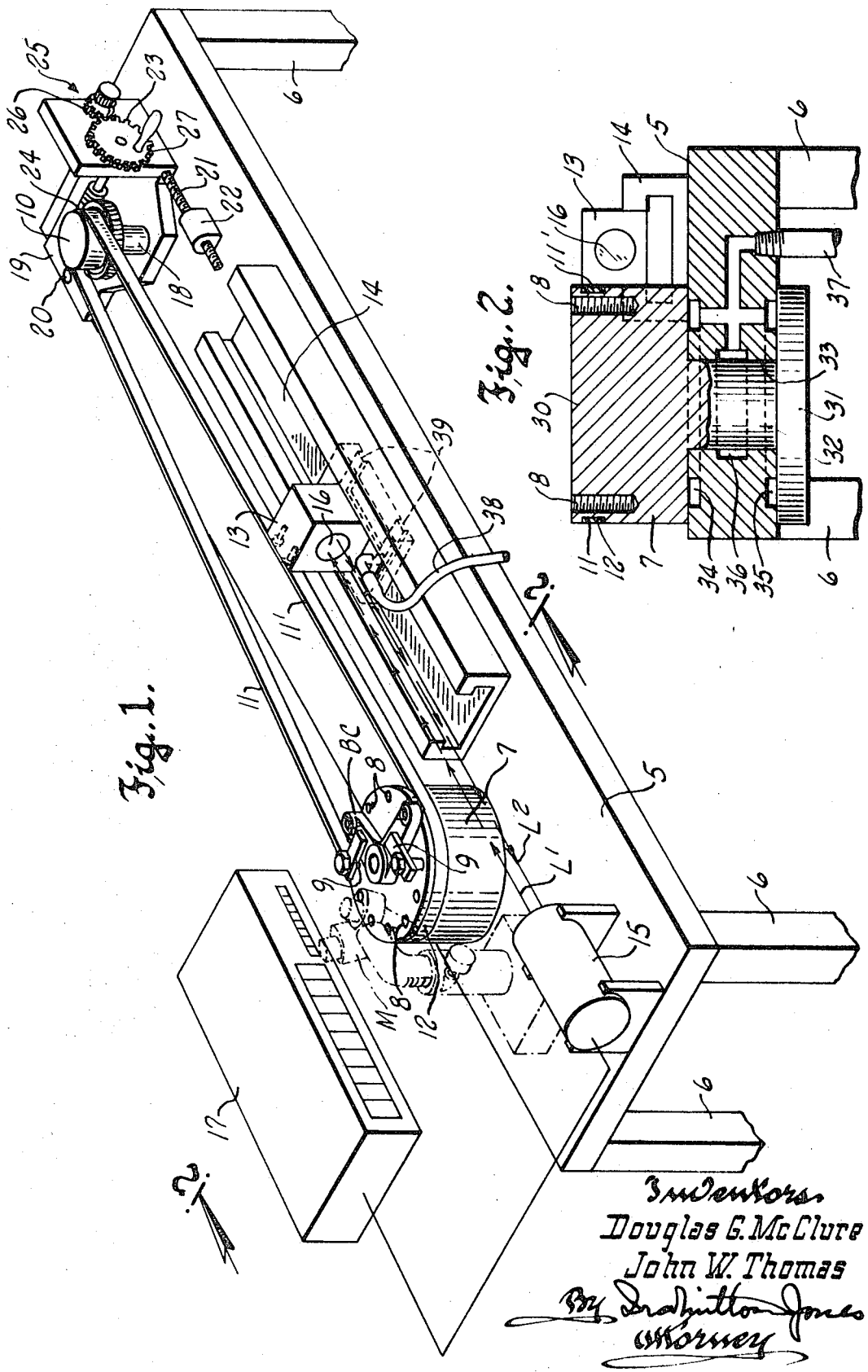

GONIOMETER

This invention relates broadly to metrology and has as its purpose to provide a precision goniometer.

More specifically it is the purpose and object of this invention to provide a goniometer wherein a turntable constrained to rotation about a fixed axis and equipped with means for securing thereto a part to be measured or positioned, has a motion-translating connection with a linearly movable slide through which any and all rotary motion imparted to the turntable is translated into linear motion of the slide that is exactly proportionate to the angle through which the turntable is turned, wherein an interferometer fixed with respect to the axis of the turntable coacts with a light-reflecting mirror on the slide to precisely measure the linear distance the slide moves, and wherein the output of the interferometer depicted on a readout device in degrees and fractions thereof precisely identifies the angle through which the turntable is turned.

With these observations and objects in mind, the manner in which the invention achieves its purpose will be appreciated from the following description and the accompanying drawing. This disclosure is intended merely to exemplify the invention. The invention is not limited to the particular structure disclosed, and changes can be made therein which lie within the scope of the appended claims without departing from the invention.

The drawing illustrates one complete example of the physical embodiment of the invention constructed according to the best mode so far devised for the practical application of the principles thereof, and in which:

FIG. 1 is a perspective view more or less diagrammatically illustrating the goniometer of this invention; and FIG. 2 is a cross-sectional view through FIG. 1 on the plane of the line 2–2.

Referring to the accompanying drawing the numeral 5 designates a rectangular granite surface plate which provides a base for the goniometer. This base may be mounted on legs 6 that are long enough to support the base at table height or are short pads to merely space the base from another surface plate. In any event there should be space below the base. Near one end of the base there is a freely rotatably mounted turntable 7 constrained to rotate about a fixed vertical axis. Tapped inserts 8 in the turntable provide means for securing a part or workpiece to the turntable. For purposes of illustration a bellcrank lever BC is shown secured to the turntable by clamps 9.

Near the opposite end of the base is a drive wheel 10 also mounted for rotation about a vertical axis.

An endless flexible nonstretchable tension element 11, preferably in the form of a flat tape, is trained about the drive wheel and a track 12 in the periphery of the turntable. A fixed tension load is maintained on the tape in a manner to be described, and since the tape is nonstretchable and does not slip on either the drive wheel or the turntable, any rotation of the drive wheel results in rotation of the turntable.

One stretch 11' of the tape is attached to a slide 13 which rides in a straight track 14 on the base and is parallel to said stretch of the tape. Hence any rotation of the turntable is accompanied by linear motion of the slide of a magnitude directly proportionate to the angle through which the turntable is turned. Accordingly, measurement of the linear motion of the slide provides an accurate determination of the degree of rotation of the turntable.

In accordance with this invention the linear motion of the slide 13, and hence the angle through which the turntable is turned, is measured interferometrically. This is done by fixedly mounting a laser interferometer 15 on the base in position to project its measuring beam, indicated by the broken line $L^1$, onto a reflecting mirror 16 carried by the slide 13. Preferably, the reflecting mirror is a trihedral cube so that the reflected beam $L^2$ is spaced from but parallel to the projected beam.

As is well known, the interferometer also produces a reference beam (not indicated) of fixed length, with which the reflected measuring beam combines to produce interfering light fringes as the length of the measuring beam changes. These interference fringes are sensed and produce an output signal which is fed into a readout device 17 which ordinarily displays the magnitude of any change in the distance between the interferometer and its reflecting mirror, in terms of linear measurement. However, since it is angular measurement with which this invention is concerned, the information provided by the readout device is in degrees and fractions of a degree. The angle between different portions of a work piece, as for instance between the arms of the bell crank lever clamped to the turntable, is thus very easily and most precisely measurable. Such angular measurement may be needed in checking the accuracy of a finished part or in positioning the part for successive machining operations.

As noted hereinbefore, the tape 11 must be maintained under a predetermined fixed tension load, and of course it should be as stable as possible against change in length due to temperature variations. To supply the latter assurance, the tape is preferably made of boron fiber which has a very satisfactory temperature coefficient.

To enable the tension on the tape to be set, the driving wheel is rotatably mounted on a pedestal 18 that is fixedly mounted on a bracket 19 for bodily movement with the bracket about a fixed pivot 20, towards and from the turntable. The pivot 20 connects the bracket with the base, and a pressure screw 21 threaded in a boss 22 that is fixed to the base provides means for adjusting the bracket location to tension the tape.

Rotation may be imparted to the drive wheel by turning a manually operable crank 23 which is drivingly connected with the drive wheel through a worm and worm wheel drive transmission 24. Such rotation of the drive wheel is, of course, imparted to the turntable by the tape and as it is, the angle through which the turntable is rotated is very precisely measured and depicted on the readout device 17 by the interferometric measurement of the concomitant linear motion of the slide 13.

A vernier 25 provides for very fine rotary adjustment of the turntable. This vernier may consist simply of a manually rotatable pinion 26 meshing with a large gear 27 which provides the arm of the crank 23 and is therefore solidly secured to the worm shaft.

It is, of course, understood that some means must be provided for establishing a reference point or index from which the angular measurement is made. This may be done by placing a high-power microscope on the surface plate 5 in position to focus on an identified spot on the part being measured on the turntable, as diagrammatically indicated at M in FIG. 1. The turntable is then rotated to bring the selected spot into focus. This done, the readout device is zeroed or cleared and the instrument is ready to be used in measuring the angle between the reference point and some other predetermined point on the part being measured. This, of course, is done by simply effecting rotation of the turntable and watching the readout information.

Obviously any other suitable means may be employed in lieu of a microscope, to establish a reference point from which the angular measurement is made, since the invention is not dependent upon any particular index or reference system.

To assure the utmost precision in the desired measurement, the track 14 along which the slide travels, is preferably formed of granite, and for the same reason both the slide and the turntable are supported on films of air usually referred to as "air bearings." The specific structure by which this free floating support is provided for the turntable and the slide forms no part of this invention and may be of any suitable formation. Thus, for instance, as shown in FIG. 2, the turntable may be a spool with a massive top flange 30 connected with a narrow bottom flange 31 by a hub 32 which passes through a cylindrical hole 33 in the base.

Annular grooves 34 and 35 in the top and bottom surfaces of the base radially inward of the periphery of the turntable and concentric to the hole 33 and another annular groove 36 in the wall of the hole substantially medially of its ends receive air under pressure from a suitable source thereof through a duct 37. The pressure at which the air is supplied is just enough to produce and maintain a film of air between all contiguous surfaces of the base and turntable.

The air bearing for the slide 13 may be provided by similarly supplying air under pressure by means of a flexible hose 38 to grooves 39 in the slide.

From the foregoing description taken with the accompanying drawing it will be apparent that this invention provides a goniometer by which angular measurement of angular positioning of work pieces can be effected with an accuracy and precision heretofore not attainable.

We claim:

1. A goniometer comprising:
   A. a base;
   B. a turntable mounted on the base for rotation about an axis fixed with respect thereto;
   C. straight track means on the base;
   D. a slide mounted on said track means for linear movement therealong;
   E. light-reflecting means fixed on said slide;
   F. interferometer means fixed on the base and coacting with said light-reflecting means to provide for accurate measurement of the magnitude of any movement of said slide along the track means;
   G. a circular track on the turntable concentric to its axis of rotation;
   D. a flexible nonstretchable tension member trained about said circular track on the turntable and having a nonslipping engagement therewith,
      said tension member having a stretch thereof tangent to said circular track and parallel to said straight track means;
   I. means securing said stretch of the tension member to said slide; and
   J. means acting on said slide to maintain a predetermined fixed tension on said stretch of the tension member,
      so that any rotation of the turntable is accompanied by linear movement of the slide along said straight track means and the measurement of the magnitude of such linear movement of the slide is an accurate indication of the angle through which the turntable has been rotated.

2. The goniometer of claim 1, further characterized by drive means connected with said stretch of the tension member to impart endwise movement thereto and thus effect rotation of the turntable.

3. The goniometer of claim 2, wherein the interferometer means is in line with and opposite one end of said straight track means, and
   wherein said drive means comprises
      1. a drive wheel rotatably mounted on the base opposite the other end of said track means, and
      2. a motion imparting connection between the flexible tension member and the drive wheel.

4. The goniometer of claim 3, wherein the flexible tension member is endless and is trained about the drive wheel as well as the circular track on the turntable.

5. The goniometer of claim 1, wherein the underside of the turntable on is directly contiguous to the top of the base,
   and wherein the mounting of the turntable on the base comprises a journal depending from the turntable and a bearing in the base in which said journal is received, and further characterized by
   means for maintaining a film of air between the contiguous surfaces of the journal and the bearing and the turntable and the base.

6. The goniometer of claim 4, wherein the mounting of the drive wheel provides for bodily adjustment thereof towards and from the turntable; and
   means for effecting such adjustment and thereby tensioning the flexible tension member.

7. The goniometer of claim 3, further characterized by rotation imparting means drivingly connected with the drive wheel for imparting rotation thereto.

8. The goniometer of claim 1, further characterized by means for maintaining a film of air between contiguous surfaces of the slide and the track means.

9. The goniometer of claim 5, wherein the base and the turntable are formed of granite.